Figure 1:
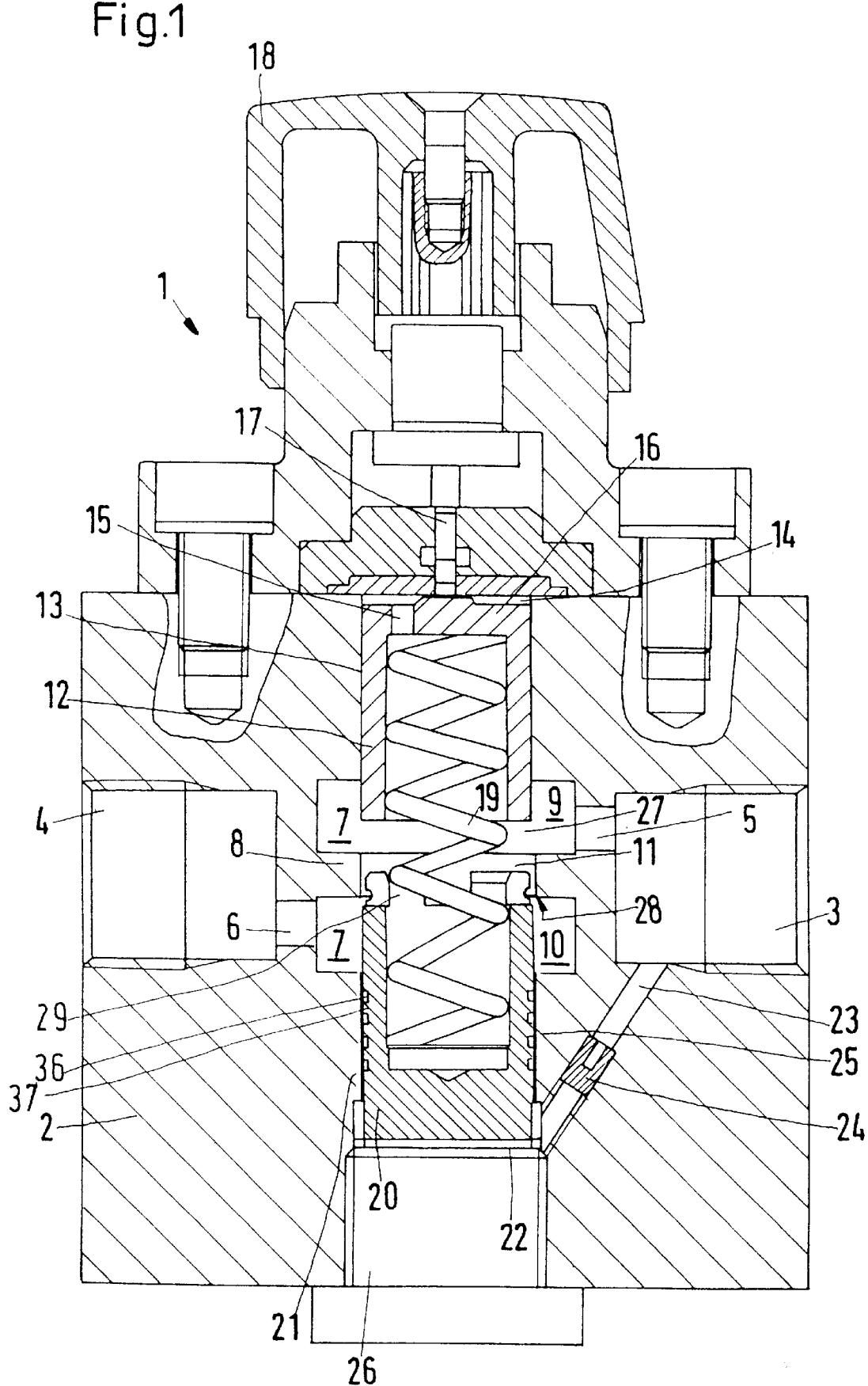

United States Patent
Helge

[11] Patent Number: 5,806,557
[45] Date of Patent: Sep. 15, 1998

[54] WATER-OPERATED HYDRAULIC CONTROL VALVE

[75] Inventor: Nielsen Helge, Sydals, Denmark

[73] Assignee: Danfoss A/S, Nordborg, Denmark

[21] Appl. No.: 597,863

[22] Filed: Feb. 7, 1996

[30] Foreign Application Priority Data

Mar. 1, 1995 [DE] Germany ............... 195 07 086.0

[51] Int. Cl.$^6$ ........................................ G05D 7/01
[52] U.S. Cl. ............................... 137/501; 137/503
[58] Field of Search .......................... 137/501, 503, 137/504

[56] References Cited

U.S. PATENT DOCUMENTS

| | | | |
|---|---|---|---|
| 1,985,443 | 12/1934 | Clute | 137/503 |
| 3,402,735 | 9/1968 | Kates | 137/501 |
| 3,724,494 | 4/1973 | Alber | 137/501 |
| 5,647,394 | 7/1997 | Valbjorn et al. | 137/501 |

Primary Examiner—Stephen M. Hepperle
Attorney, Agent, or Firm—Lee, Mann, Smith, McWilliams, Sweeney & Ohlson

[57] ABSTRACT

A water-operated hydraulic control valve is disclosed, having a throttling device which comprises a throttling element (20) which is in the form of a piston which cooperates with a substantially hollow-cylindrical counter-element (8).

In order also to be able to operate such a control valve with water, that is, a non-lubricating fluid of low boiling point, the throttling element (20) projects with one end (29) into the counter-element (8). Distributed in the circumferential direction, several apertures (30) are provided in the throttling element (20) or in the counter-element (8), forming a flow path through the overlap region between throttling element (20) and counter-element (8), and distributed in the circumferential direction there is provided an arrangement of pressure pockets (33), which arrangement is in fluid connection with the apertures (30) and is arranged at least partially in the overlap region.

13 Claims, 2 Drawing Sheets

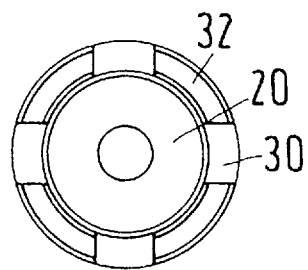
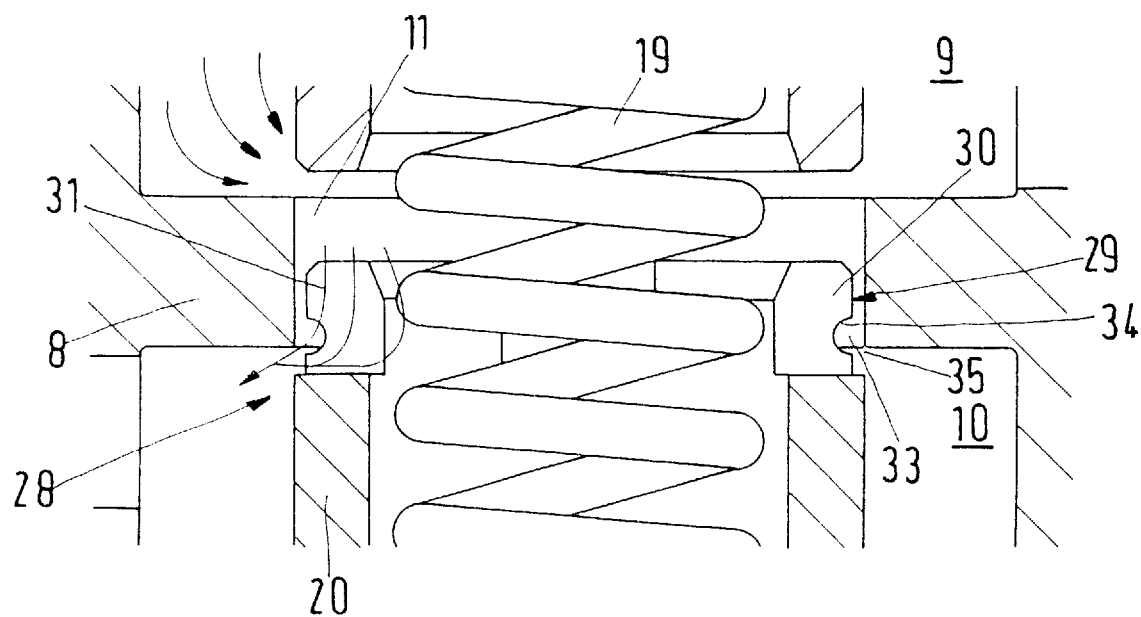

WATER-OPERATED HYDRAULIC CONTROL VALVE

The invention relates to a water-operated hydraulic control valve.

Since, for reasons connected with protection of the environment, many hydraulic oils are being regarded with increasing condemnation because of their toxicity, there has been a move in some cases towards the use of water as a hydraulic fluid. The use of water as a hydraulic fluid has many advantages. In particular, there is unlikely to be any impact on the environment through the use of water as a hydraulic fluid. The use of water does, however, create some technical problems, which when oils were used as hydraulic fluids were minor. Thus, for example, unlike oils, water has virtually no lubricating properties. Moreover, water generally also has a much lower boiling point than the hydraulic oils used hitherto. This can lead, for example, to vapour bubbles which may in turn in some circumstances bring on cavitation problems.

In a hydraulic circuit which is being operated with water as the hydraulic fluid, control of the pressure or the amount of the hydraulic fluid flowing through is also frequently necessary. Many constructions of hydraulic control valves are known, but not all hydraulic control valves can be used without problems in water hydraulics.

Most control valves contain an adjusting element which in one way or another opens a flow path to a greater or lesser degree. In other words, the adjusting element forms with a counter-element an adjustable throttle. Generally speaking, two opposing forces act on the adjusting element here. During the control, the adjusting element adjusts its position so that the forces are in equilibrium. These principles are known per se and do not require further expansion.

A good control valve should be able to respond to changes as quickly as possible; these changes can occur on the output side, when the load or the actual value changes, and on the input side, when the input variable, for example, the hydraulic pressure, changes. Furthermore, changes can occur when the reference variable or the desired value is changed. Briefly, the response of the control valve comprises essentially a change in the position of the adjusting element. There are limits, however, to the speed with which the adjusting element is able to change its position. Firstly, the adjusting element has a certain mass, the inertia of which must be overcome. This problem also exists in the case of valves which have hitherto been used for oil-hydraulics. Secondly, the adjusting element also has to overcome a certain friction. In particular at the start of a movement, this friction is, as it were, a static friction, and therefore relatively large. When using oil as the hydraulic fluid, this static friction is quite considerably reduced by the lubricating effect of the oil, so that previously the problem was less significant. When using water as the hydraulic fluid, however, it has been observed that when relatively small changes are made the adjusting element does not move satisfactorily, for example, when the difference in forces across the adjusting element caused by a change was not large enough. In that case, the control by the control valve is decidedly unsatisfactory.

GB 2 014 277 A discloses a valve for the control of a constant flow, having a throttling element which is in the form of a hollow piston which is arranged in a hollow cylinder and is displaceable against the force of a spring in dependence on the pressure conditions prevailing. With its wall the piston closes an outlet opening from the cylinder. The piston is provided at its opposite end face with an inlet opening.

DE 29 17 851 C2 discloses a hydraulic quantity-regulating valve for water distributers of underground workings in which the throttling element is stationary and the counter-element is movably arranged. The throttling element in this case is in the form of a hollow cylinder, in the wall of which there are arranged one or more drain bores. When the counter-element is put under pressure, it moves over the throttling element so that the drain bore is closed to a greater or lesser extent.

The invention is based on the problem of improving the control behaviour of a water-operated hydraulic control valve.

This problem is solved by a water-operated hydraulic control valve having a throttling device which comprises a throttling element which is in the form of a piston which co-operates with a substantially hollow-cylindrical counter-element, the throttling element having an end projecting into the counter-element, several apertures distributed in the circumferential direction being provided in the throttling element or in the counter-element and forming a flow path through the overlap region between throttling element and counter-element, and an arrangement of pressure pockets distributed in the circumferential direction being provided, which arrangement is in fluid connection with the apertures and is arranged at least partially in the overlap region.

In this construction, the throttle element is acted upon all round with pressurized water. This result is served firstly by the apertures distributed in the circumferential direction, which ensure that the forces acting on the throttling element are directed essentially so that they cancel each other out in the radial direction. In this manner the throttling element is prevented from positioning itself one-sidedly against the counter-element. This would lead to considerable static friction which would impair the start of the throttling element's movement. The build-up of forces is much improved, however, also by the arrangement of pressure pockets which is likewise provided around the throttling element and which ensures that between the throttling element and the counter-element there is always a cushion of pressure which exerts on the throttling element a force equilibrium such that the sum of the radial forces on the throttling element is zero. The throttling element can therefore fit with relatively little play and small tolerances into the counter-element. The proposed construction with the apertures and combined therewith the pressure pockets, always ensures not only that there is an equilibrium of forces, which prevents the throttling element sticking to the counter-element, but also that cushions of fluid which produce a film of water between the throttling element and the counter-element are formed. Even though water per se has no lubricating properties, this film of water effects a reduction in the friction between the throttling element and the counter-element, so that even small force differences across the throttling element are sufficient to result in displacement of the throttling element.

The pressure pocket arrangement is preferably formed by a circumferential groove. This groove has, for example, the same cross-section around the circumference, or is at least formed so that the pressure combined with the effective surface is uniform around the throttling element. This ensures on the one hand that the sum of the radial forces on the throttling element is minimized and on the other hand that the film of fluid that is fed from this pressure pocket arrangement is really available over the entire circumference of the throttling element.

It is also preferred that at least three apertures are provided and all apertures are of the same size and arranged at the same distance apart in the circumferential direction. This facilitates manufacture. If all apertures are made the same size, and are arranged symmetrically around the circumference, one can ensure that the forces that are exerted by the water pressure in the apertures are of equal magnitude around the circumference, so that the sum of the radial forces is zero.

Seen in cross-section, the pressure pocket arrangement preferably has a curved base. This improves the flow properties and thus facilitates filling of the pressure pocket arrangement.

This is of particular advantage when the pressure pocket arrangement is arranged on the throttling element and in a middle working position lies opposite an edge of the counter-element, the edge being on the throttling element side.

In that case, the pressure pocket arrangement serves at the same time to protect the edge of the counter-element. The water that here flows out of the overlap region between the throttling element and the counter-element is able to flow around the edge of the counter-element because the corresponding space has been made available by the pressure pocket arrangement. In particular in conjunction with the curved construction of the base, conditions obtain here which drastically reduce wear and tear on this edge. Because the pressure pocket arrangement is arranged exactly in the region of the edge of the counter-element, that is, the pressure pocket arrangement therefore opens at least with a part of its area into a region which is no longer masked by the counter-element, one can also guarantee that there is always a certain flow of water here which ensures that the pressure in the pressure pocket arrangement remains built up. This pressure need not be as great as the input pressure of the valve. It merely needs to be adequate to hold the throttling element reliably away from the circumferential walls of the counter-element.

The throttling element is preferably constructed, at least in the region of its end, as a hollow piston, and the apertures are in the form of through-openings in the wall of the hollow piston. In that case a relatively large flow cross-section of the apertures is available as flow path for the water. The pressure reduction that is to be achieved with the throttling element can be restricted to relatively closely encompassed but clearly defined regions. This also reduces wear.

In an especially preferred embodiment, provision is made for the throttling element to be held for part of its length in a guide which has a fluid path between the guide and the throttling element, the throttling element having in a region inside the guide at least one groove arrangement which is arranged point-symmetrically with respect to the axis of the throttling element. By this means, guiding of the throttling element at two spaced positions along its length is achieved. Firstly, the throttling element is held in the counter-element by the pressure pocket arrangement so that there is no possible contact between the counter-element and the throttling element. Secondly, the throttling element is additionally still guided at a position removed therefrom, which further reduces the risk of contact between the throttling element and its counter-element. In this guidance there is, however, the same problem that the throttling element is restricted in its mobility by static friction. That problem is mitigated by the point-symmetrically arranged groove arrangement which likewise forms around the throttling element a pressure cushion which in relation to the guide results in the sum of the radially acting forces being virtually zero. This groove arrangement is permanently supplied through the groove arrangement with water as hydraulic fluid, so that at least in the region of the groove arrangement a film of fluid which further improves the potential mobility of the throttling element is likewise able to build up.

This is especially true if the groove arrangement is formed by an annular groove. In that case, the water is able to disperse uniformly as hydraulic fluid around the throttling element and accordingly produce a uniform pressure. At the same time, the opportunity for the fluid film to form is provided around the entire circumference of the throttling element.

Several axially distributed annular grooves are preferably provided, adjacent annular grooves being spaced around 0.5 mm to 1.5 mm apart. With this construction one ensures firstly that the equilibrium of forces is not restricted to a single point, viewed in the axial direction. On the contrary, the zero sum of the radially effective forces is produced at several axially spaced points of the throttling element in the guide, so that the throttling element is also unable to tilt around the one point at which this equilibrium of forces exists in the case of a single groove. The selected small distance between adjacent grooves takes account of the fact that, because of the surface tension of the water, this small distance can be bridged so that here, even without a relatively large supply of fluid, a film of water is able to build up, resulting in a correspondingly small friction of the throttling element in the guide.

It is also preferred for the throttling element to be arranged on the low pressure side of the counter-element and to be acted upon in the closing direction by a pressure dependent on the input pressure and in the opening direction by a pressure dependent on the output pressure and by an auxiliary force. The auxiliary force can be produced, for example, by a spring. The throttling element then assumes a position in which the auxiliary force is of the same magnitude as the difference between the force difference caused by the input pressure and the force difference caused by the output pressure. The construction has moreover the advantage that, because of the generally higher input pressure, a pressure difference is directed across the throttling element such that the desired amount of water is able to flow through the fluid path in order to improve the frictional conditions.

In an especially preferred construction, the throttling element and/or the counter-element are surface-hardened. This reduces wear. Moreover, a surface-hardened part generally has better frictional properties.

In that case it is especially preferred for the throttling element or the counter-element to have a surface layer of amorphous carbon. Such a coating has diamond-like surface qualities and is also known in the art as diamond-like carbon, see in this respect US H1210 or U.S. Pat. No. 5,204,167. Such a surface coating guarantees a relatively long service life.

The thickness of the surface layer is preferably in the region of 1 to 1.5 $\mu$m. A layer this thin is sufficient to achieve the desired performance.

The invention is described below hereinafter with reference to a preferred embodiment in conjunction with the drawings, in which:

FIG. 1 is a diagrammatic section through a control valve,
FIG. 2 is an enlarged fragment of FIG. 1, and
FIG. 3 is a plan view of a throttling element.

The invention is explained using the example of a water-operated hydraulic control valve which is intended to hold the pressure constant independently of the loading on a load.

The water-operated hydraulic control valve 1 has a housing 2 having an inlet connection 3 and an outlet connection 4.

In the inlet connection 3 the pressure is an input pressure of the water, which is supplied, for example, by a pressure source, not illustrated, such as a pump. In the outlet connection 4 the pressure is an output pressure of the water, which corresponds to the input pressure of a load, likewise not illustrated. This load input pressure is generally dependent on the loading of the load.

The inlet connection 3 is connected by way of a first fixed throttle 5 and the output connection 4 is connected by way of a second fixed throttle 6 to a chamber 7, which is divided by a separating wall 8 into a first half 9, which is connected to the input connection 3, and a second half 10, which is connected to the output connection 4. The separating wall 8 has a hollow-cylindrical bore 11 which forms the connection between the first and the second half 9, 10 of the chamber 7. Projecting into the first half is an adjusting element 12 in the form of a hollow cylinder which is guided in a bore 13, the bore being in the housing 2 on the side of the first half 9 of the chamber 7. The adjusting element 12 defines on the side remote from the chamber 7 a pressure chamber 14, which is acted upon through an opening 15 in the end wall 16 with the same fluid pressure as the first half 9 of the chamber. This end face 16 lies adjacent to a set ting element 17, which can be displaced axially, that is, in the direction of movement of the adjusting element 12, by a rotary knob 18, in order to change or fix the position of the adjusting element 12 in the housing 2. The adjusting element 12 is pressed by a compression spring 19 against the setting element 17. The compression spring 19 is here accommodated inside the adjusting element 12, which for that purpose is in the form of a hollow piston.

The other end of the compression spring 19 bears against the inside of a throttling element 20, also in the form of a hollow piston. Here, the compression spring 19 is guided through the bore 11 in the separating wall 8. The separating wall 8 forms with the bore 11 a counter-element with which the throttling element 20 co-operates.

To that end, the throttling element 20 projects with one end 29 into the bore 11. The outer diameter of the throttling element 20 corresponds here substantially to the internal diameter of the bore 11.

As is especially apparent from FIGS. 2 and 3, at one end 29, the end with which it projects into the bore 11, the throttling element 20 has slots 30 which form a flow path, indicated by arrows 31, for the water through the overlap region between throttling element 20 and bore 11. Four slots 30 are illustrated, all of the same size and distributed uniformly around the circumference of the throttling element 20. The slots 30 pass through the wall of the hollow cylindrical throttling element 20 in this region.

Furthermore, the end 29 of the throttling element 20 is provided with a pressure pocket arrangement 33, which in this particular case is in the form of an annular groove 34 which encircles the throttling element 20 in this region around the entire circumference thereof. The annular groove 34 has for that purpose a curved base. It is arranged in a region which in normal operation lies opposite an edge 35 of the separating wall 8 at the throttling element end of the bore 11. In this annular groove 34 a certain pressure is continuously maintained by the water flowing out through the slots 30, with the result that the throttling element 20 is acted upon uniformly all round with radial pressure forces, with the result that the throttling element 20 does not come into contact with the wall of the bore 11 at any point. Moreover, this annular grove 34 provides a reservoir of water from which a film of water can be fed between the throttling element 20 and the separating wall 8. The curved construction of the base of the annular groove 34 produces flow properties which keep the wear and tear on the edge 35 very low.

The throttling element 20 is mounted so as to be axially displaceable in a guide 21 in the housing 2. Within this guide it has several annular grooves 36, in this particular case four, which surround the throttling element 20 at the circumference thereof. Between the annular grooves there are webs 37 which have a width in the region of 0.5 to 1.5 mm.

Acting on the side of throttling element 20 remote from the spring 19 is the water pressure in a pressure chamber 22, which is connected by way of a channel 23 to the inlet connection 3. In the channel 23 there is arranged an exchangeable or adjustable nozzle element 24. Between the throttling element 20 and the housing 2 there is in the bore 21 a small gap 25 as fluid path. This gap 25 can be very small. It must merely be sufficient to allow a flow of water from the pressure chamber 22 into the chamber 7. This water naturally passes also into the annular grooves 36 and builds up a certain pressure there, which ensures that the throttling element 20 is guided in the bore 21 virtually without contact. Moreover, the water supply in the annular grooves 36 represents a reservoir which allows a film of water to form between the throttling element 20 and the guide 21. The webs 37 are only wide enough so that a cohesive film can remain between adjacent grooves 36 as a result of the surface tension of the water. The pressure chamber 22 is closed by a stopper 26.

The adjusting element 12 forms in known manner with the separating wall 8 a first throttle 27, which can be adjusted from the outside, whilst the throttling element 20 forms with the separating wall 8 a second throttle 28, which is acted upon in the closing direction by a pressure dependent on the pressure at the inlet connection 3 and is acted upon in the opening direction by a pressure dependent on the pressure at the outlet connection 4 and by the force of the spring 19 as auxiliary force. The size of the first throttle 27 is adjustable by way of the hand knob 18, whilst the size of the second throttle 28 adjusts itself in dependence on the loading, that is to say, the pressure at the outlet connection 4. The basic construction of such a valve is known and described, for example, in the late-published German Patent Application P 43 41 848. Because of the pressure pocket arrangement 33 in the overlap region between the bore 11 and the end 29 of the throttling element 20, the throttling element 20 is acted upon with water pressure so that it maintains on all sides a uniform spacing from the inner wall of the bore 11. The same applies to the situation inside the guide 21. Moreover, provision is everywhere made for a film of water to build up between the bore 11 and the guide 21 and the throttling element 20, which contributes further to a reduction in friction. Because, even in the state of rest, there is always a flow of fluid past the throttling element 20, both in the guide 21 and in the bore 11, it is possible to ensure that a necessary change in the position of the throttling element is at least not held up by a static friction. The control valve 1 is therefore able to respond very quickly because the throttling element 20 can change its position without having to overcome relatively large forces.

The throttling element 20 is surface-hardened, that is, it has on its surface a hardened layer of amorphous carbon. Such a hardened layer has a thickness in the region of about 1 to 1.5 $\mu$m. It is known by the name "diamond-like coating", see in this context US H1210 or U.S. Pat. No. 5,204,167. Such a surface hardening additionally helps to reduce the friction between the housing 2 and the throttling element 20 and to reduce wear. The good performance of the control valve can therefore be maintained over a considerable time period.

I claim:

1. A water-operated hydraulic control valve having a throttling device which comprises a throttling element which is in the form of a piston which cooperates with a substantially hollow-cylindrical counter-element, the throttling element having an end projecting into the counter-element and spaced from the counter-element, several apertures distributed in a circumferential direction being provided in the throttling element or in the counter-element and forming a flow path through an overlap region between the throttling element and the counter-element, and including an arrangement of pressure pockets in the projecting end distributed in the circumferential direction, said arrangement being in fluid connection with the apertures and being arranged at least partially in the overlap region.

2. A control valve according to claim 1, in which the pressure pockets arrangement is formed by a circumferential groove.

3. A control valve according to claim 1, in which at least three of said apertures are provided and all apertures are of the same size and arranged at the same distance apart in the circumferential direction.

4. A control valve according to claim 1, in which in cross-section the pressure pockets arrangement has a curved base.

5. A control valve according to claim 1, in which the pressure pockets arrangement is located at the throttling element and in a middle working position lies opposite an edge of the counter-element, the edge being on the throttling element side of the counter-element.

6. A control valve according to claim 1, in which the throttling element is constructed, at least in a region of said end, as a hollow piston having a wall, and the apertures are in the form of through-openings in the wall of the hollow piston.

7. A control valve according to claim 1, in which the throttling element is held for part of its length in a guide which has a fluid path between the guide and the throttling element, the throttling element having in a region inside the guide, at least one groove arrangement being arranged symmetrically with respect to a central axis of the throttling element.

8. A control valve according to claim 7, in which the groove arrangement is formed by an annular groove.

9. A control valve according to claim 8, including several axially distributed annular grooves, adjacent annular grooves being spaced about 0.5 mm to 1.5 mm apart.

10. A control valve according to claim 1, in which the throttling element is arranged on a low pressure side of the counter-element and is acted upon in a closing direction by a pressure dependent on input pressure and in an opening direction by a pressure dependent on output pressure and by an auxiliary force.

11. A control valve according to one of claims 1, in which at least one of the throttling element and the counter-element is surface-hardened.

12. A control valve according to claim 11, in which one of the throttling element and the counter-element has a surface layer of amorphous carbon.

13. A control valve according to claim 12, in which the thickness of the surface layer is in the region of 1 to 1.5 $\mu$m.

* * * * *